Nov. 17, 1964   F. W. WALDRON ETAL   3,157,545
METHOD AND APPARATUS FOR MAKING CONTINUOUS LENGTHS OF
RUBBERIZED BIAS-CUT FABRIC FROM A TUBULAR LENGTH
Filed March 29, 1962   9 Sheets-Sheet 8
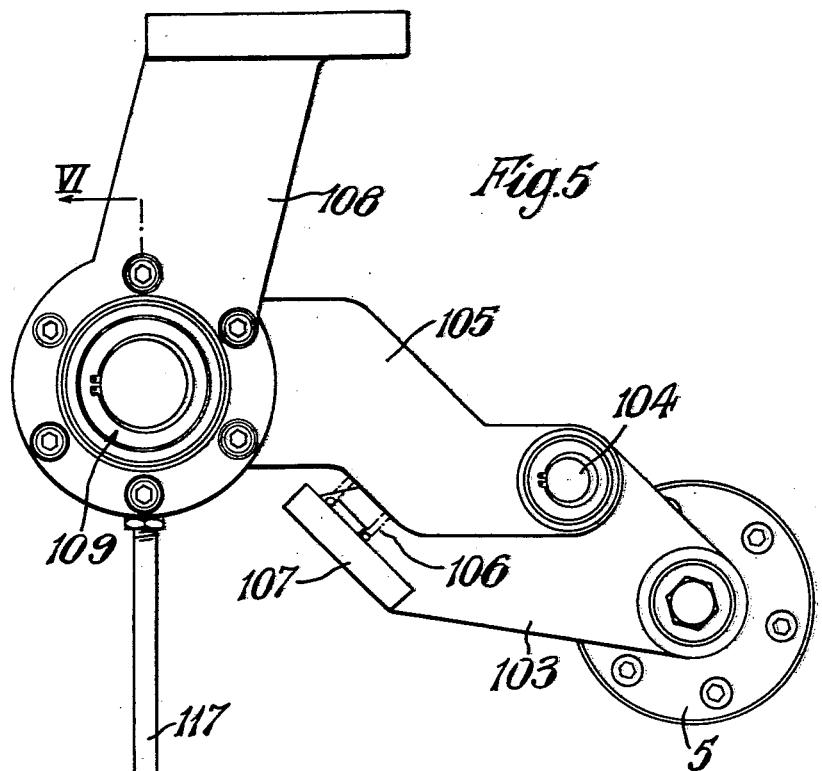
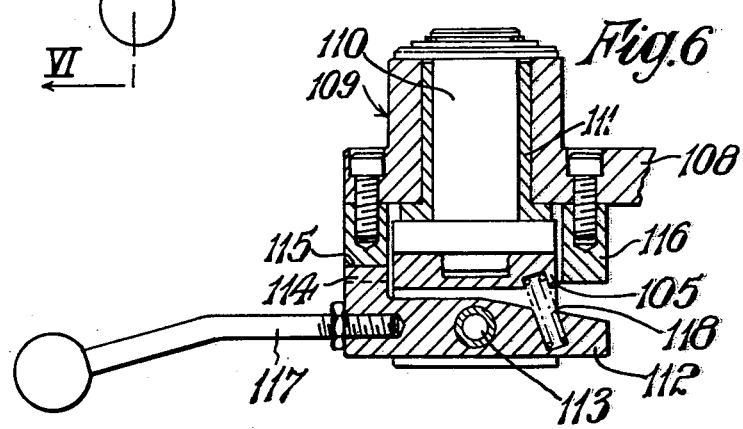
Inventors
Felix Walter Waldron
Harold Hurdley Green
William Douglas Bennett
by Benj. T. Rauber
attorney

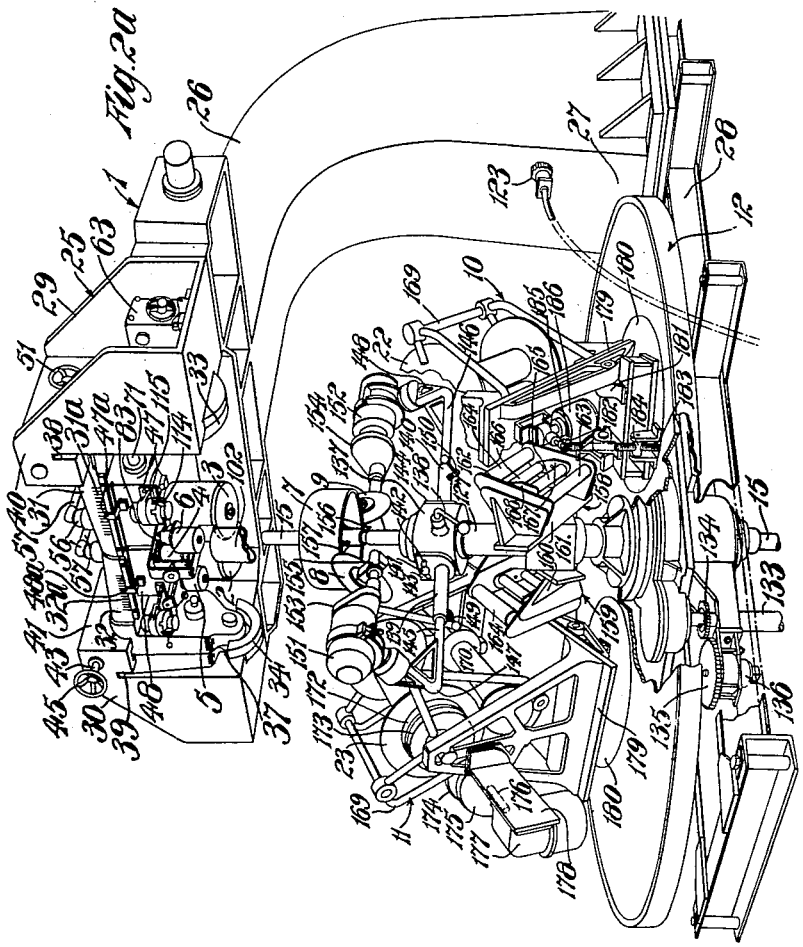

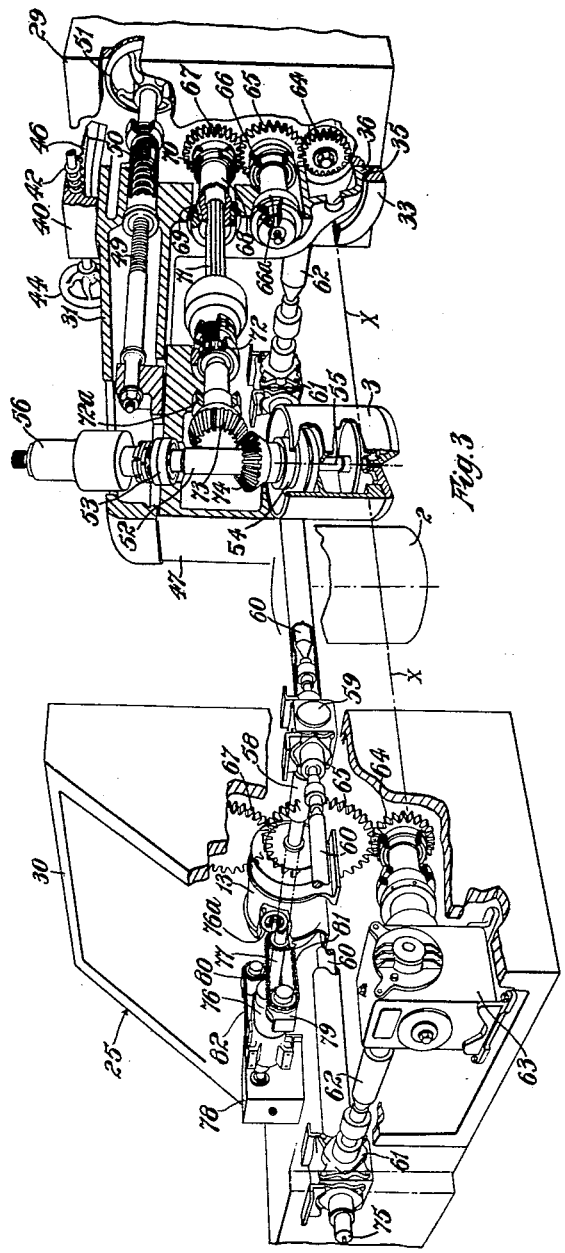

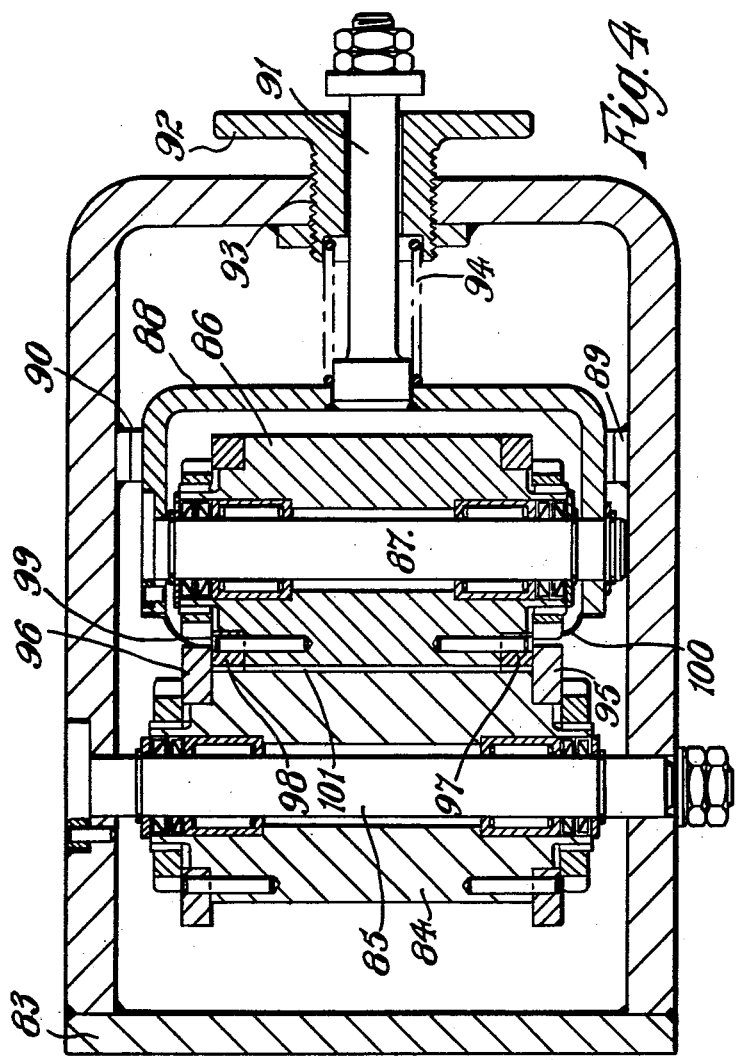

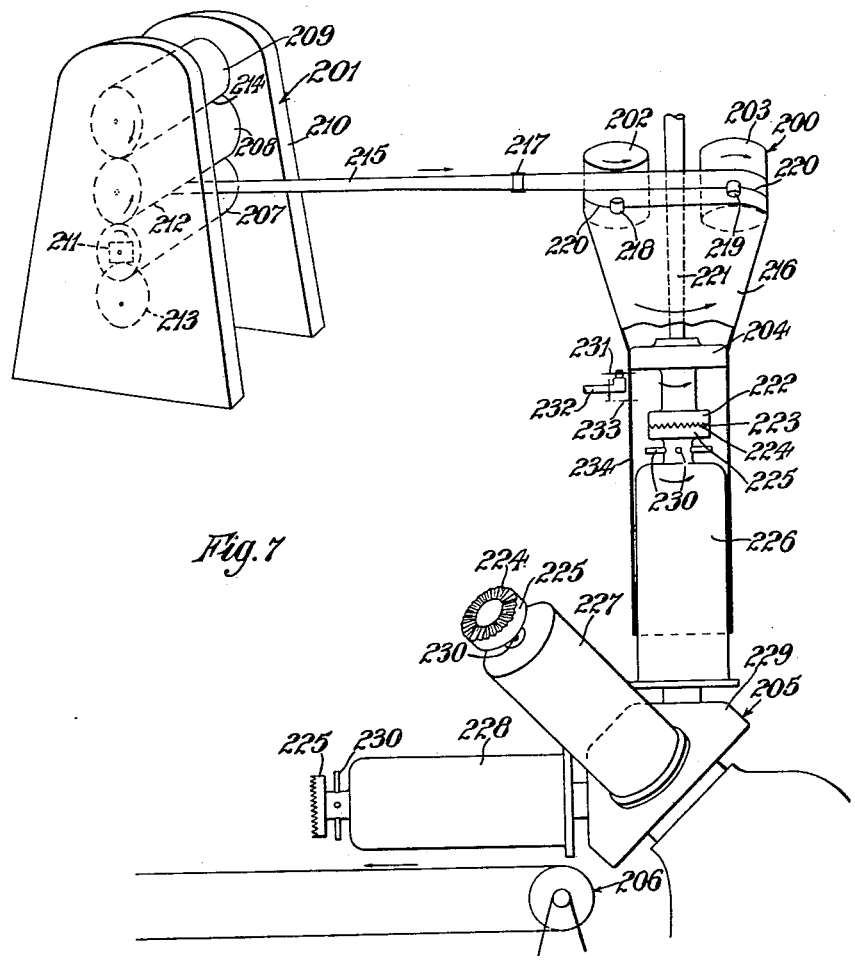

United States Patent Office 3,157,545
Patented Nov. 17, 1964

3,157,545
METHOD AND APPARATUS FOR MAKING CONTINUOUS LENGTHS OF RUBBERIZED BIAS-CUT FABRIC FROM A TUBULAR LENGTH
Felix Walter Waldron, Little Aston, Streetly, Harold Hurdley Green, Castle Bromwich, and William Douglas Bennett, Weston-Super-Mare, Somerset, England, assignors to Dunlop Rubber Company Limited, London, England, a British company
Filed Mar. 29, 1962, Ser. No. 183,461
Claims priority, application Great Britain, Mar. 30, 1961, 11,628/61
43 Claims. (Cl. 156—184)

This invention relates to the production of tubular lengths of rubber and rubberised fabric and to the manufacture of rubber sheet and ply fabric for reinforced rubber articles, e.g., pneumatic tyres.

In the known method of manufacture of bias-cut ply fabric for the manufacture of pneumatic tyres, parallel cord fabric, having a woven weft thread thinner than the warp threads to hold the parallel cords in position, is passed in a width of approximately 60 inches between the bowls of a calender to effect rubberisation of the cords.

In order to produce bias-cut ply fabric from this length of rubberised cord material, strips are cut, at a correct predetermined bias angle (the angle made by the cords of the strip with the longitudinal direction thereof) and it is then necessary for the strips to be joined end-to-end to produce a continuous length of bias-cut fabric to be fed either to a pocket-making or a tyre building machine.

This known method has a number of disadvantageous features.

The thin weft is necessary only to support the 60 inch width of fabric and is not necessary when the size of the fabric is reduced by bias-cutting into strips; it is introduced by a weaving operation with attendant cost. The weak weft does not perform any useful function in the tyre construction and is even detrimental to it since the spacing of the warp cords is increased so that the strength per unit width is reduced. The wide rolls of the fabric are heavy and thus difficult to transport and bulky to store.

The bias-cut lengths are joined together by a lap joint so that a double thickness of material is produced at the joint. The joints, which occur at random location points in a built-up tyre, prevent a completely uniform construction from being achieved.

The wide 60 inch rolls of un-rubberised fabric have to be stored and sometimes dipped in a solution prior to the rubberisation process of a calender. They are then formed into further rolls of bias-cut fabric in the manner described and the fact that two rolling-up operations are necessary increases the likelihood of stretch and distortion of the fabric during handling. In the case of each roll, canvas liners are interleaved to prevent adhesion between adjacent turns of the fabric and these liners need to be cleaned and rewound frequently.

The manufacture of wide fabric, which is subsequently cut into smaller bias-cut widths involves the use of large, heavy and costly equipment and installation and maintenance is very expensive. The breakdown of one large unit can seriously affect production. Large units are inflexible when frequent changes of production are required.

One object of the present invention is to provide a method and apparatus for producing a tubular length of unvulcanised rubber or rubberised fabric material, and a further object of the invention is to provide an improved method and apparatus for producing ply fabric for reinforced rubber articles, e.g., pneumatic tyres.

According to the invention a method of producing a tubular length of unvulcanised rubber or rubber covered fabric material comprises continuously helically winding a strip of said material upon a pair of spaced-apart drums having their axes inclined one with respect to the other in such a manner that a tubular length is formed from the helical winding, and continuously consolidating the helical joint between adjacent helical turns.

According to the invention also a method of manufacturing a continuous length of unvulcanised rubber or rubber covered fabric sheet material from a strip of said material having a narrower width than that of the length to be manufactured, comprises continuously producing a tubular length of said sheet material by the method defined in the preceding paragraph and continuously cutting the tubular length so formed to produce at least one continuous length of sheet material.

Further in accordance with the invention, a method as defined in the preceding paragraph, for manufacturing a continuous length of bias-cut ply material from a strip of rubberised ply fabric having warp cords, comprises continuously cutting the tubular length in such a manner as to produce at least one continuous length of bias-cut ply material.

The invention also includes a method of manufacturing continuous bias-cut ply material comprising feeding a plurality of closely adjacent parallel lengths of ply fabric filamentary material into at least one calender to apply a coating of hot unvulcanised rubber to both sides of the parallel lengths, cooling the strip of rubberised fabric so formed, and feeding the strip of rubberised fabric to an apparatus for trimming the edges of the fabric to provide a strip having a required width, helically winding the fabric into a tubular length and cutting the tubular length in such a manner as to produce at least one length of bias-cut ply material.

The tubular length may be continuously cut at one position or simultaneously at a plurality of positions, e.g., where two positions are used they can be diametrically opposite, to produce two lengths of ply material from the single tubular length, and the bias angle of the ply material can be adjusted by adjusting the angle at which the tubular length is cut. This also affects the width of the ply material so formed and the required width can be obtained by adjusting the distance between the axes of the drums. This controls the diameter of the tubular length formed and, therefore, the width of the ply material cut therefrom for mentioned and hereinafter described.

In a modified method according to the invention, instead of winding a single length of fabric around the drums, a double length formed from two strips of rubberised fabric partially superimposed on one another in half-lapped relationship is used so that a double thickness tubular length is formed to be bias-cut into ply material. This method of manufacture ensures that the cords in the two thicknesses are perfectly parallel to one another.

The filamentary material before passing through a calender may, e.g., in the case of rayon or nylon cord material, be dipped in a latex-resin solution to assist the adhesion of rubber to the filamentary material and then dried in a bed of fluidised solid material of the kind described in the specification of co-pending patent applications of Goy et al. Ser. No. 725,677, filed April 1, 1958, now abandoned and 73,459, filed February 12, 1960. Where nylon is used it will be necessary to stretch the nylon cords, while heated, prior to their delivery to the ply winding machine. This can be effected in the said bed of fluidised solid material or in another such bed.

According to another aspect of the invention, a method of producing a tubular length of unvulcanised rubber for the manufacture of pneumatic tyre inner tubes comprises producing a continuous strip of unvulcanised rubber by means of a calender, feeding the strip to an apparatus for trimming the edges of the strip to provide a strip of a required width, and helically winding the strip by the method defined above, the calendering process being controlled to vary the thickness of the strip periodically so that when wound into a tubular length one side of the length is of greater thickness than the diametrically opposite side.

In the method defined in the preceding paragraph measured lengths of tube are preferably cut from the tubular length as it leaves the drums.

In addition the invention includes apparatus for producing a tubular length of unvulcanised rubber or rubber covered fabric material comprising a pair of spaced-apart drums having their axes inclined one with respect to the other, the drums being rotatable to wind a strip of said material helically to form said tubular length.

The invention also provides apparatus for manufacturing a continuous length of unvulcanised rubber or rubber covered fabric sheet material comprising apparatus as defined in the preceding paragraph for producing a tubular length of said material, and means for continuously cutting the tubular length so formed to produce at least one continuous length of said sheet material.

More than two drums may be provided, in accordance with the invention, to form and support the tubular length of material, but two drums have been found to give satisfactory results.

Means, e.g., a roller, may be provided for bearing upon the helical joint formed between adjacent helical turns to consolidate the joint and also means may be provided for adjusting the distance between the axes of the relatively inclined drums. Furthermore, trimming apparatus may also be provided for trimming the width of the strip of rubberised ply fabric or rubber strip to a predetermined value.

Moreover, the angle of inclination of the drums with respect to each other, when the drums are viewed in elevation, may be adjustable by suitable means.

Briefly, in one form of apparatus, the tubular length of material is fed from the drums onto a locating bollard rotatable at the same speed as the speed of rotation of the tubular length. A rotary cutting knife is, or rotary cutting knives are, mounted on a turntable coaxial with the bollard, the knife or knives being rotatable at a different speed of rotation from the speed of rotation of the tubular length around the tubular length to slit it into bias-cut ply material. The ply material is then spooled with interleaving fabric, the spool or spools being mounted on the turntable and thus rotating at the same speed as that of the knife or knives around the track.

The invention includes rubber sheet and rubberised ply fabric and pneumatic tyres incorporating rubber sheet or ply fabric, the sheet or fabric being manufactured by the method or with the apparatus defined in the preceding paragraphs.

The invention also includes pneumatic tyre inner tubes and lengths of rubber tubing or rubberised fabric tubing in the manufacture of which a method in accordance with the invention is used.

Two embodiments of the invention will now be described by way of example, with reference to the accompanying drawings, in which:

FIGURE 2a is one-half of a diagrammatic perspective view, partly cut-away, of apparatus in accordance with the invention for winding strip material to form a tubular length and cutting the tubular length to produce two continuous lengths of sheet material;

FIGURE 2b is a view, on a scale larger than that shown in FIGURE 2a of the other half of the apparatus of FIGURE 2a; FIGURES 2c and 2d are views, on the same scale as FIGURE 2b of the upper and lower portions of FIGURE 2a;

FIGURE 3 is a diagrammatic, partly cut-away perspective view of part of the apparatus shown in FIGURES 2a and 2b;

FIGURE 4 is a cross-sectional elevational of trimming apparatus, forming part of the apparatus shown in FIGURES 2a, 2b and 3;

FIGURE 5 is a plan view of a pressure roller and its support, forming part of the apparatus shown in FIGURES 2a, 2b and 3;

FIGURE 6 is a cross-sectional elevation, on the line VI—VI of FIGURE 5, of part of the pressure roller support shown in FIGURE 5;

FIGURE 7 is a diagrammatic perspective view of an alternative apparatus in accordance with the invention for producing measured lengths of tube.

Figure 1:
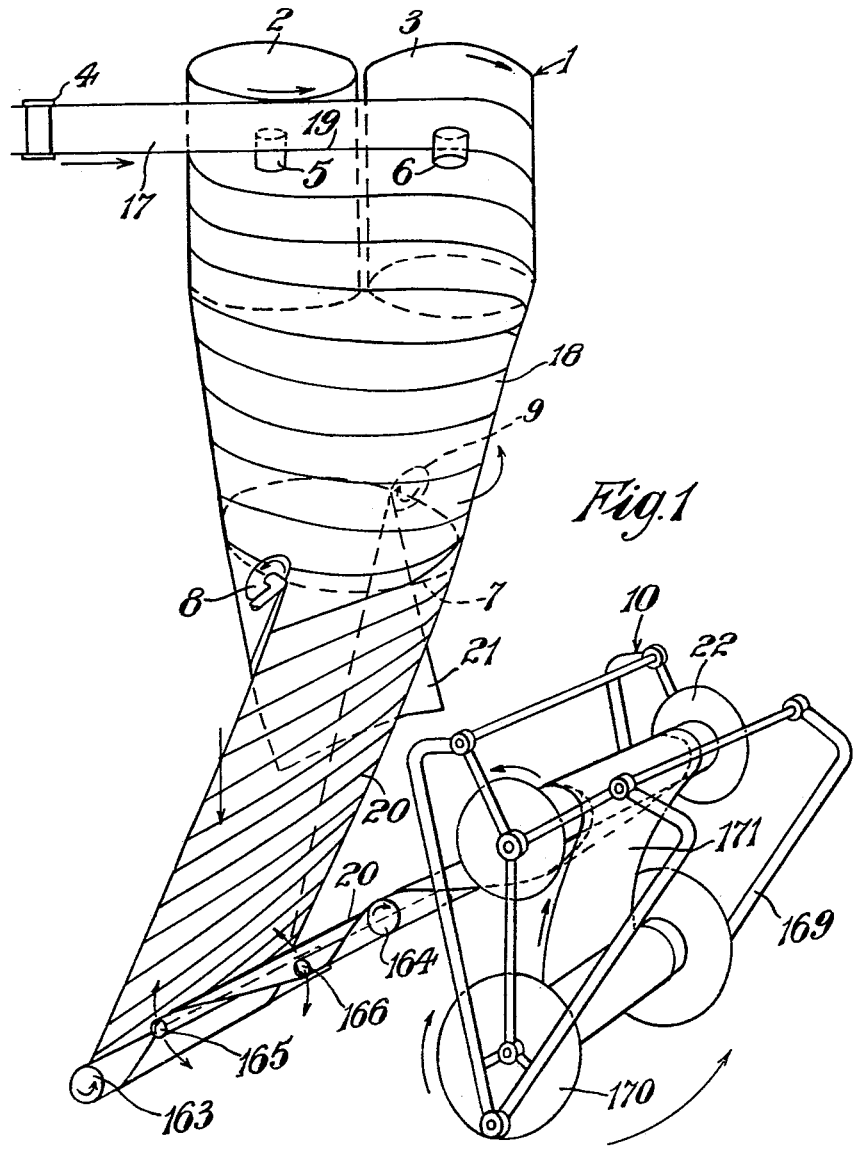
FIGURE 1 is a diagrammatic perspective view showing the production of unvulcanised rubberised fabric sheet material by a method in accordance with the invention.

The method and apparatus illustrated in FIGURES 1–6 of the accompanying drawings will now be described, first in outline and then in greater detail.

Apparatus 1 (see FIGURES 2a and 2b) for producing a tubular length of rubberised fabric material and for cutting the tubular length into bias-cut ply fabric comprises, briefly, a pair of hollow rotatable drums 2 and 3, a trimming device 4, a pair of freely rotatable pressure rollers 5 and 6, a rotatable bollard 7, a pair of rotary knives 8 and 9 and a pair of spooling units 10 and 11. The rotary knives and the spooling units are attached to, and rotatable with, a turntable 12. The drums 2 and 3 are drivable by an electric motor 13 (see FIGURE 3), the turntable is drivable by an electric motor 14, and the bollard 7, which is mounted on a shaft 15 coaxial with the turntable 12 and rotatable independently thereof, is also drivable by the motor 14 via a variable-ratio gearbox 16.

The axes of the drums 2 and 3, which intersect the imaginary line X—X (see FIGURE 3) and lie in planes at right angles to said line X—X, are tilted relative to one another so that when a strip 17 of rubberised fabric is fed to the rotating drums in the manner shown in FIGURE 1, the strip is wound around the drums and fed downwardly as a helically-wound tubular length 18 to the bollard 7.

The operation of the apparatus outlined above is, briefly, as follows.

Figure 2B:
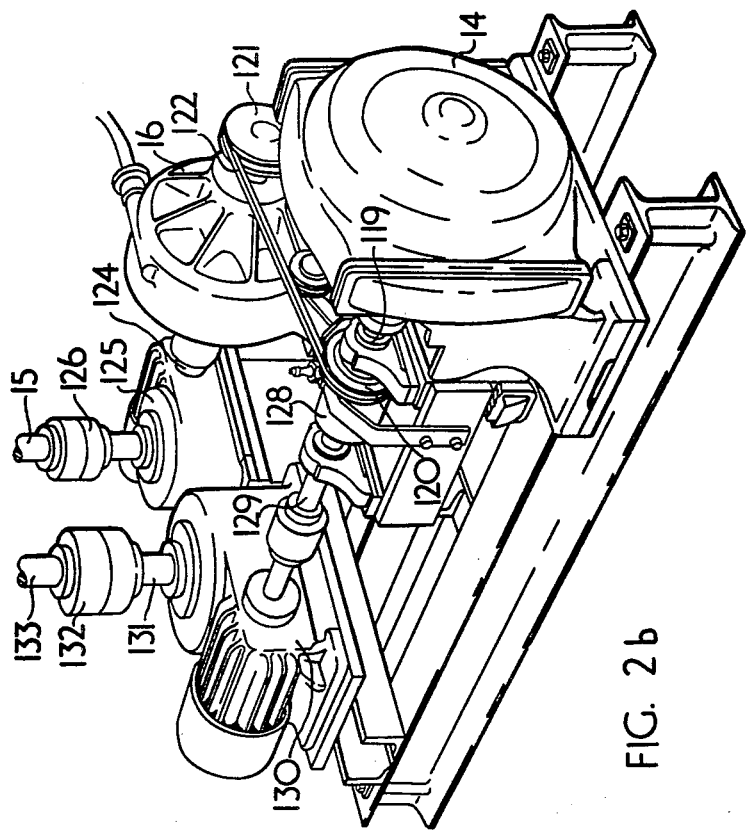
Figure 2C:
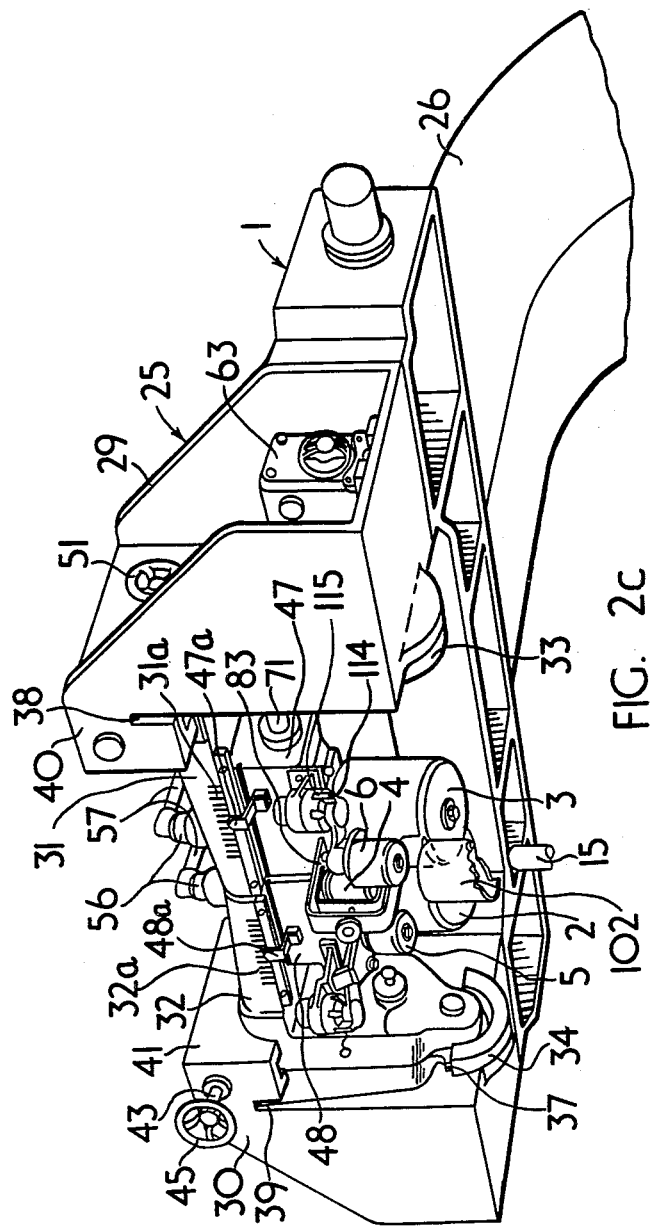
Figure 2D:
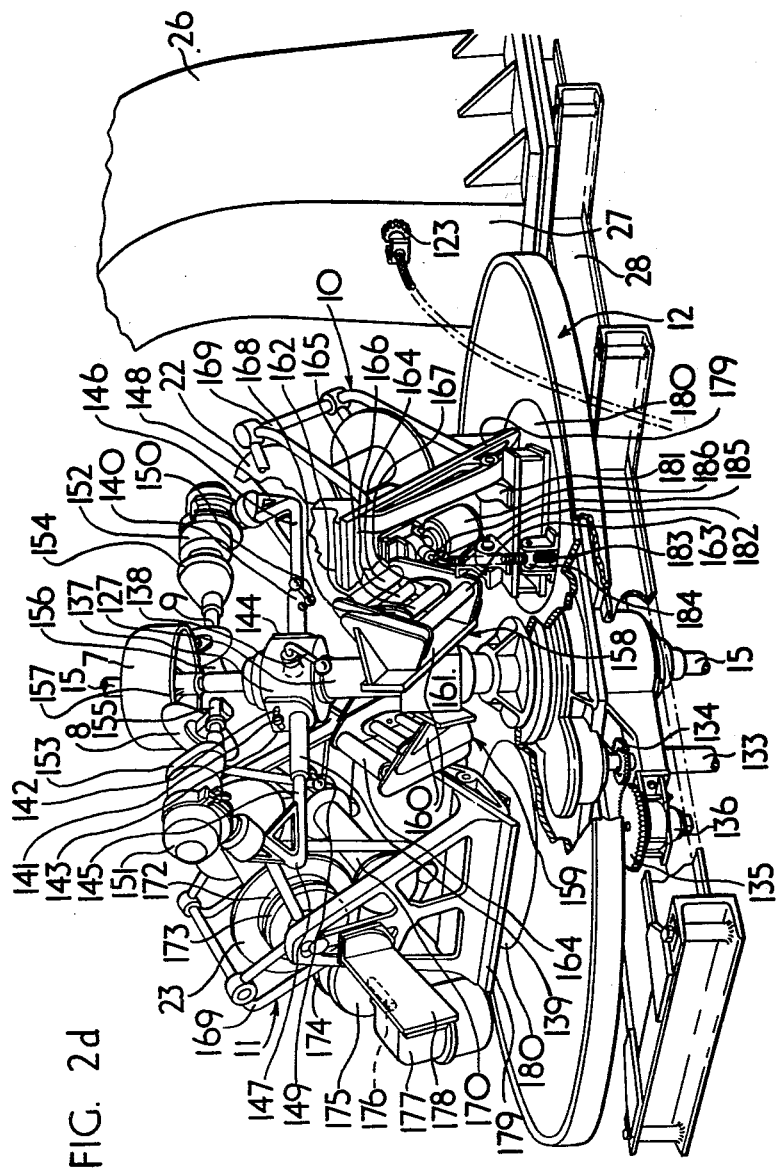

The rubberised fabric strip 17, 2½ inches wides and having warp cords only, is produced by drawing a strip of fifty-five parallel rayon cords at the desired lateral spacing from a creel and passing the strip through a conventional calender in which the cords are rubberised on both sides, cooling the rubberised strip, and passing the strip through a festooning device, such as that described in the specification of co-pending patent application of Bennett et al. Ser. No. 851,100, filed November 5, 1959, now abandoned. The strip 17 is then passed through the trimming device 4 (shown spaced from the drums 2 and 3, in FIGURE 1, for clarity: FIGURE 2 shows the actual position of the device 4) to remove surplus rubber from the sides of the strip. The strip is then wound around the rotating drums 2 and 3 as shown in FIGURE 1, the freely rotatable pressure roller 6 bearing upon the helical butt joint 19 formed between successive turns of the fabric strip, to consolidate the joint. The tubular length 18 thus formed, still rotating, is fed downwardly to the bollard 7 which forms the tubular length into a tube of circular cross-section and serves to support the tubular length to enable the length accurately to be severed by the knives 8 and 9. The bollard surface speed is arranged to be equal to the surface speed of the tubular length, but the speed of rotation of the turntable 12 and hence that of the knives 8 and 9 around the common axis of the bollard and the turntable is set at a predetermined speed relative to the speed of rotation of the tubular length so that the angle at which the knives sever the cords of the tubular length may be arranged to have a desired value.

The tubular length is thus severed into two continuous lengths 20 and 21 of bias-cut fabric, the bias angle of the cords in each length of fabric being dependent on the difference between the surface speed of rotation of the tubular length and that of the turntable. The continuous lengths 20 and 21 are reeled up, respectively, on spools 22 and 23 which are mounted on the turntable and thus travel around the tubular length in synchronism with the knives.

The width of the lengths 20 and 21 is dependent on the spacing between the axes of the drums 2 and 3, and this is adjustable to enable different widths of bias-cut fabric to be formed. When an adjustment is made to the spacing between the drum axes it is also necessary to change the bollard, substituting a bollard of the appropriate diameter. The knives 8 and 9 are set with their blades making an angle to the vertical appropriate to the desired bias angle at which the fabric is to be cut.

The apparatus 1 shown in FIGURES 2-6 will now be described in greater detail.

The rotatable drums 2 and 3, which are 6 inches in diameter, and their ancillary apparatus are carried in a head unit 25 supported in cantilever fashion by a casting 26 secured at its base 27 to a framework 28 on which the turntable 12 is rotatably mounted. The head unit 25 comprises a pair of end pieces 29 and 30 rigidly fixed to the casting 26. Housings 31 and 32 are pivotally mounted, respectively, on the end pieces 29 and 30, the housings 31 and 32 being supported by blocks 33 and 34 respectively, attached to the end pieces 29 and 30, respectively, and containing semi-circular grooves 35 (see FIGURE 3) into which semi-circular tongues 36 and 37, respectively, formed on the housings 31 and 32 are slidably fitted. The upper portions of the housings 31 and 32 are also provided with tongues (not illustrated) which are engaged in grooves 38 and 39 formed respectively in blocks 40 and 41 attached respectively to the end pieces 29 and 30. Lead screws 42 and 43 rotatable by hand wheels 44 and 45, respectively, are carried, respectively, in the blocks 40 and 41 and engage toothed segments 46 attached to the housings 31 and 32 (only the segment 46 attached to the housing 31 is shown—see FIGURE 3). Pointers (not shown) are attached to the housings 31 and 32 and move over scales fixed to the end pieces to indicate the angular disposition of the housings.

Drum supports 47 and 48, respectively, are slidably mounted in the housings 31 and 32 and are movable towards or away from one another by means of lead screws 49 (only the lead screw 49 associated with the support 47 is shown—see FIGURE 3), the lead screws being fixed to the supports and being engaged by screw-threaded nuts 50 rotatably mounted in the housings 31 and 32 and rotatable by hand wheels 51 (only the nut 50 and hand wheel 51 associated with the housing 31 are shown—see FIGURE 3). Pointers 47a, 48a are fixed to the supports 47, 48 respectively to indicate the position of the supports with respect to scales 31a, 32a respectively marked on the housings 31 (see FIGURE 2a).

The drums 2 and 3, their associated supports 48 and 47, and their drive mechanisms which are now to be described, are exactly similar and in the following description one reference numeral only will be used for similar components.

The drums 2 and 3 are attached to shafts 52 carried in bearings 53 and 54 fixed to the supports 48 and 47. Each shaft 52 is hollow and contains a pipe 55 passing coaxially through the hollow shaft 52 and communicating via a gland 56 with a pipe 57 through which cooling water can be supplied to the hollow interior of the associated drum via the pipe 55, the water returning via the space between the pipe 55 and the interior surface of the hollow shaft 52 and communicating with an outlet pipe (not shown). The drums are drivable by the motor 13 through the following gear sequences (see FIGURE 3):

The output shaft 58 of the motor 13 is connected to a gear box 59 from which two drive shafts 60, one for the drum 2 and one for the drum 3, are drivable in synchronism. The drive shafts 60 are connected via bevel gear boxes 61, drive shafts 62 and bevel gear boxes 63 to spur gears 64 mounted with their axes in alignment with the common pivotal axis X—X of the housings 31 and 32.

The drive is then transmitted via idler gears 65 carried in bearings 66, 66a fixed to the respective housings 31 and 32, to spur gears 67 mounted on shafts 68 rotatably carried in bearings 69 and 70 fixed to the housings and drivably engaged internally by splined shafts 71 rotatably supported in bearings 72, 72a fixed to the drum supports 48 and 47. The shafts 72 are connected to drive the drums 2 and 3 via bevel gears 73 and 74, the drums 2 and 3 thus being driven at equal speeds in the same direction as one another.

The motor 13 is provided with a speed control in the form of a tachometer 75 mounted on one of the bevel gearboxes 61 and drivable by the associated shaft 60 to provide an electrical voltage proportional to the speed at which the drums 2 and 3 are being driven. The tachometer 75 is connected to a conventional electrical control system (not shown) to control the speed of the motor 13, and also to a second electrical control system (also not shown) to control the speed of the turntable drive motor 14. The second electrical control system comprises a variable-ratio gearbox 76 (see FIGURE 3) the ratio of which may be controlled by a mechanical control 76a, the input shaft of the gearbox 76 being driven by an extension shaft 77 of the motor 13 and the output shaft of the gearbox 76 driving the input shaft of a fixed-ratio gearbox 78. The gearbox 78 comprises a magslip shaft position indicator (not shown), driven by the output shaft of the gearbox 78. A pair of electrical impulse switches 79 and 80, driven respectively by chain and sprocket drives 81 and 82 connected, respectively to the input and output shafts of the variable-ratio gearbox 76 are connected to electrical impulse counters (not shown) to enable the ratio of the gearbox 76 to be accurately determined. The remaining parts of the second control system, associated with the turntable drive motor 14, and the operation of the control system, will be described later in the specification.

The trimming device 4 (see FIGURE 4), which is mounted in a support frame 83 attached to the drum support 47 comprises a metal roller 84 freely rotatably mounted on an axle 85 fixed in the frame 83, and a metal roller 86 freely rotatably mounted on an axle 87 fixed in a stirrup 88. The stirrup 88 is engaged by guide blocks 89, 90 fixed to the frame 83 to maintain the axes of the rollers 85 and 86 parallel to one another and a plunger 91 fixed to the stirrup 88 is slidably mounted in a screw-threaded bush 92 engaged in a corresponding screw-threaded hole 93 in the frame 83. A compression spring 94 is provided to force the stirrup 88 and thus the roller 86 towards the roller 84. A pair of hardened steel annular flanges 95 and 96 are provided on the ends of the roller 84, and a pair of corresponding hardened steel annular rings 97 and 98 are fixed to the ends of the roller 86, to form the edges of recessed end portions of the roller 86.

When the strip 17 is passed through a nip 101 between the rollers 84 and 86 surplus material is severed from its edges by cutting elements formed by the engagement of the flanges 95 and 96 on the roller 84 with the corresponding rings 97 and 98 on the roller 86. Deflectors 99 and 100 are provided, respectively, at the upper and lower ends of the rollers 84 and 86 to guide material severed from the edges of the strip 17 into a receptacle 102 (see FIGURE 2a). The pressure between the rollers 84 and 86 may be adjusted by screwing the bush 92 inwardly or outwardly with respect to the frame 83 to increase or decrease, respectively, the pressure exerted by the compression spring 94 on the roller 86.

The pressure rollers 5 and 6 associated respectively with the drums 2 and 3 are identical in all respects and one only, therefore, will be described (see FIGURES 5 and 6). The roller 5 (see FIGURE 5) is freely rotatably mounted on an arm 103 which is itself pivotally connected by a pivot pin 104 to an arm 105. A compression spring 106 secured to the arm 105 bears against a flange 107 formed on the arm 103, tending to move the arm 103 about the pivot 104 in an anticlockwise direction as seen in FIGURE 5. Stops (not shown) are provided to limit the movement of the arm 103 around the pivot 104. The arm 105 is connected to a bracket 108 attached to the drum support 48 by a pivotal connection 109 (see FIGURE 6).

The pivotal connection 109 consists of a rotatable pin 110 mounted in a bush 111 on the bracket 108 and fixed at its lower end to the arm 105. A locking member 112 is pivotally mounted on the arm 105 by a pivot pin 113, and is provided with a tooth 114 for engagement with one of a series of corresponding notches 115 formed in a notched ring 116 secured to the bracket 108. The locking member 112 may be rocked about its pivot 103 by means of a lever 117 secured to the locking member to engage or disengage the tooth 114 with a notch 115. A compression spring 118 secured at its ends to the locking member 112 and the arm 105 is provided to tend to rotate the locking member 112 about its pivot 113 so as to press the tooth 114 into engagement with the notch 115.

The arm 105 may be rotated about the pivotal connection 109 by the lever 117, by pressing the lever downwardly to disengage the tooth 114 from the notch 115 and rotating the lever 117 about the pivotal connection 109. The arm 105 may thus be moved in a clockwise direction as seen in FIGURE 5 to draw the roller 5 clear of the drum 2, or the arm 105 may be moved in an anticlockwise direction as seen in FIGURE 5 to press the roller 5 towards the drum 2. When the roller 5 is pressed into contact with the drum 2 the arm 103 carrying the roller is rotated about its pivot 104 and the spring 106 is thus put into a state of compression. The locking member 112 is then engaged with the notched ring 116 to hold the roller in spring-loaded contact with the drum.

The drives to the turntable 12 carrying the knives 8 and 9 and spooling units 10 and 11 and to the bollard 7 are arranged as follows (see FIGURES 2a and 2b):

The turntable drive motor 14 is a direct current electric motor provided with a tachometer (not shown) for generating an electrical voltage proportional to the speed of the motor 14, the tachometer being connected together with the tachometer 75 to a conventional electrical control system, incorporating a Ward-Leonard control, which ensures that the speed of the motor 14 is kept at a fixed speed relative to the speed of the drum drive motor 13, to within very close limits. The output shaft 119 of the motor 14 is connected by pulleys 120 and 121 and a drive belt 122 to the variable-ratio gearbox 16, the ratio of the gearbox 16 being variable by a mechanical control 123. The output shaft 124 of the variable-ratio gearbox 16 is connected by a gearbox 125 and coupling 126 to the shaft 15, which passes vertically through a hollow shaft 127 attached to and coaxial with the turntable 12. The shaft 15 is freely rotatable within the shaft 127 and carries, at its upper end, the bollard 7 as previously described.

The shaft 119 is also connected to a clutch 128, the output shaft 129 of which is drivably connected to a gearbox 130. The output shaft 131 of the gearbox 130 is connected by a coupling 132 to a shaft 133 carried in bearings (not shown) attached to the framework 28 and having a spur gear attached to its upper end in engagement with a corresponding gear wheel (also not shown) fixed to the turntable. The turntable is rotatably supported on the framework 28 in thrust bearings (not illustrated) coaxially with the shaft 15 and is thus drivable by the motor 14. A spur gear 134 mounted on the shaft 133 is meshed with a corresponding gear 135 connected to drive a magslip shaft position indicator 136 fixed to the framework 28 (for an explanation of the operation of a magslip shaft position indicator see "Textbook of Servomechanisms," page 137, West, published by English Universities Press, London, 1953). The magslip 136 is electrically connected to the magslip contained in the gearbox 78, which, as described above, is driven by the drum drive motor 13 via the variable-ratio gearbox 76. The ratio of the fixed-ratio gearbox 78 is chosen so that when the drums and the turntable are rotating with the speed of the turntable at a predetermined value relative to the speed of the drums, suitable for the production of fabric having an average value of bias angle, the magslip 136 and the magslip contained in the gearbox 78 are rotating in synchronism. An electrical signal from the two magslips, proportional to the angular displacement of the shaft of one magslip relative to that of the other magslip, is fed into the second electrical control system mentioned above, to provide, in conjunction with the signals from the tachometers associated with the motors 13 and 14, an additional control of very great accuracy. The tachometer controls are used to bring the turntable speed to a value approximating very closely to the desired value and the magslips then correct this value to an even greater degree of accuracy.

The clutch 128 is provided to enable the surface speed of the bollard 7 to be set to a value approximating closely to the surface speed of the tubular length, which is slightly less than the surface speed of the drums 2 and 3, owing to the helical disposition of the strip 17 in the tubular length 18. The surface speed of the tubular length is equal to the rate at which the strip 17 is fed to the drums (i.e., the drum surface speed) multiplied by the cosine of the angle to the horizontal at which the strip 17 is disposed in the tubular length 18. When the clutch 128 is disengaged the turntable 12 stops rotating and the speeds of the drums and of the bollard, controlled in this instance by the tachometers alone, may be measured by means of a hand tachometer applied directly to the drum surface and to the bollard surface, and the speed of the bollard may then be adjusted by means of the mechanical control 123 provided for the gearbox 16.

The hollow shaft 127 carries a sleeve 137 slidable and rotatable on the shaft 127 and lockable in position thereon by a clamp 138. A pair of hollow supporting arms 139 and 140 are fixed to the sleeve 137 and project radially in diametrically opposite directions from the shaft 127. The arms 139 and 140 are rotatably mounted on the sleeve 137 and may be secured in any desired angular position relative to the vertical direction by means of bolts 141 screwed into the sleeve 137 and passing through arcuate slots 142 formed in plates 143, 144 attached to the arms 139, 140, respectively.

The hollow supporting arms 139, 140 are provided with internal keyways (not shown) for engagement with corresponding keys (also not shown) formed on shafts 145, 146 which constitute parts of knife supporting brackets 147, 148, respectively. Clamps 149, 150 are provided to lock the brackets 147, 148, respectively, to the supporting arms 139, 140.

A knife drive motor 151 is clamped to the bracket 147 and a knife drive motor 152 is clamped to the bracket 148. The drive motors 151, 152 are connected to drive their respective rotary knives 8 and 9 by means of gearboxes 153 and 154, respectively, and bevel gearboxes 155, 156, respectively. The knives 8 and 9 each consist of a thin steel disc which is rotatable by its associated motor at a speed of the order of 8,000 revolutions per minute, and are arranged on their supports so that the edges of the blades are just clear of the lower edge 157 of the bollard 7, a portion of each blade projecting into the region vertically beneath the bollard.

The spooling units 10 and 11 are provided with fabric feed units 158 and 159 respectively, mounted on the shaft 127. The feed units 158 and 159 are similar to one another, as are the spooling units 10 and 11, and in the following description one reference numeral only will be used to define similar components in these items.

The feed units 158, 159 each comprise a supporting frame 160 pivotally mounted on a block 161 attached to the shaft 127, the units 158, 159 each being lockable in any desired angular position on the block 161 to orientate the feed unit correctly to receive fabric cut at any required bias single. A sub-frame 162 is pivotally mounted within the frame 160, the sub-frame 162 carrying freely rotatable guide rollers 163 and 164 and freely rotatable tension control rollers 165 and 166. The pivotal axis of the sub-frame 162 lies parallel with and adjacent to the roller 163, so that the upper part of the sub-frame 162 can be swung downwardly and outwardly towards the associated spooling unit (see FIGURE 1, which shows the arrangement of the rollers 163–166 in operation of the apparatus). The tension control rollers 165 and 166 are mounted on a pair of parallel arms 167 and 168 which are pivotally attached at their mid-points to the sub-frame 162. A conventional electrical transducer (not shown) is connected to the arm 168 and is actuated by movement of the arm 168 about its pivot to provide an electrical signal for a purpose to be described.

The spooling units 10 and 11 comprise frames 169 on which the spools 22, 23 for reeling up the lengths 20 and 21 (see FIGURE 1) of fabric, respectively, are rotatably mounted. Spools 170 carrying canvas lining material 171 are rotatably mounted on the frames 169 to supply lining material to the spools 22, 23, the lining material 171 being reeled up on the spools 22, 23, in operation of the apparatus, together with the continuous lengths 20, 21 of bias-cut fabric to prevent adjacent turns of the bias-cut fabric from sticking together.

The spools 22 and 23 are each provided with a pair of friction drums 172 and 173 (see the spool 23 in FIGURE 2a) rigidly connected coaxially to the spools. The drums 172 and 173 are drivably engaged, respectively, in operation of the apparatus, with drums 174 and 175 mounted on a shaft 176 drivable by an electric motor 177. The motor 177 is supported on a bracket 178 fixed to a cradle 179 to which the frame 169 is detachably secured. The drum 174 is drivably connected to the shaft 176 to convey a drive from the motor 177 to the associated spool via the drum 172; and the drum 175 is freely rotatably mounted on the shaft 176 and connected to a brake (not shown) to apply, via the drum 173, a braking torque to the spool to prevent fabric wound on to the spool from unwinding when the motor 177 is not operating.

The rollers 165 and 166, together with the transducers attached to the arms 168 in the feed units 158, 159 form part of a control means including conventional control apparatus (not shown) to which the transducers are connected, respectively, to control the respective motors 177. The connections between the transducers and the motors 177 are such that when the arms 167 and 168 carrying the tension control rollers 165 and 166 are rotated in the anti-clockwise direction (as seen in FIGURE 1) by an increase in tension of the fabric passing around the rollers, the speeds of the respective motors 177 are decreased. Conversely when the arms 167 and 168 are rotated in the clockwise direction as the result of a decrease in tension of the fabric, the speeds of the respective motors 177 are increased. The fabric is thus automatically wound on the respective spools without excessive tension. The centrifugal force due to rotation of the turntable 12 is greater on the roller 166 (see FIGURE 1) than on the roller 165, and this results in sufficient clockwise torque being applied to the arms 167 and 168 to provide a restoring torque opposed to the torque resulting from tension in the fabric.

The cradles 179 are mounted on subsidiary turntables 180 which are carried on the turntable 12 and are each rotatable about an axis parallel to that of the turntable 12 to enable the angular disposition, in a plane perpendicular to the axis of the turntable 12, of the axes of the spools 22, 23 to be adjusted. Each subsidiary turntable may be fixed by a clamp (not shown) in a required position according to the bias angle at which the fabric lengths 20, 21 are severed from the tubular length 18.

The cradles 179 are each mounted on coaxial pivots 181, 182 fixed to the turntables 180, and may be tilted about the common axis of these pivots to adjust the angular disposition in a vertical plane of the axes of the spools 22, 23. A lead screw 183, in engagement with a nut 184 mounted on the turntable 180 is provided for adjusting the angle of tilt of the cradle, the lead screw 183 being attached at its upper end to a flexible coupling 185 drivable by an electric motor 186 mounted on the cradle.

Electrical connections between the associated electrical control apparatus and the knife drive motors 151, 152, spool drive motors 177, and cradle tilt-adjusting motors 186 are made between slip rings and associated brushes (both integers not illustrated) mounted on the turntable 12.

The setting-up and operation of the apparatus 1 to produce a tubular length of rubberised fabric material and to cut the tubular length into two strips of bias-cut ply fabric each having a bias angle of approximately 61° and a width of approximately 17 inches will now be described.

The housings 31 and 32 carrying the drums 2 and 3 are tilted by operation of the hand wheels 44 and 45 respectively until the axes of the drums are disposed at an angle of 23½° with respect to one another (viewed in the direction of the axis X—X shown in FIGURE 3), the drums being equally inclined in opposite directions with respect to the vertical. The horizontal distance between the drum axes is adjusted by means of the hand wheels 51, the axes being set at a distance of 10 inches apart. This setting enables the 2½ inch wide strip 17 to be wound around the two drums and to form a butt joint 19 between adjacent helical turns, to form the tubular length 18. The perimeter of the tubular length 18, when formed into circular cross-sectional shape is such that it will fit slidably around a bollard of 12.35 inches diameter.

The drums are set by the control apparatus provided to rotate at a surface speed of revolution of 135 feet per minute, this speed providing the tubular length 18 with a rate of rotation of 41.69 revolutions per minute and a rate of descent of 104.5 inches per minute. The angle at which the cords in the tubular length are disposed to the transverse direction of the length after the length has left the drums is approximately 3° 41 minutes.

The bollard surface speed is set by the control 123 described above to be approximately equal to the surface speed of the tubular length and the speed of rotation of the turntable is set by adjustment of the variable-ratio gear box 76 so that the turntable rotates at 44.43 revolutions per minute. The difference between the speeds of rotation of the turntable and of the tubular length results in each of the knives 8 and 9 making a helical cut in the tubular length as the length descends, the resulting bias angle of the cords in the severed strips 20 and 21 being equal to approximately 61° in this instance.

It should be noted that the figures given above for the speeds of rotation of the turntable and drums required to produce fabric having a bias angle of 61° have been derived theoretically, and that in practice adjustment of these speeds may be necessary to take account of factors such as the effect of stretch in the material of the tubular length.

The strip 17 of rubberised parallel cord fabric is produced as follows:

Fifty-five lengths of cord from spools of cord mounted on a creel are led in parallel relationship into a dipping bath containing a solution of latex and resorcinol-formaldehyde. This dipping treatment is well known and serves to assist adhesion of rubber to the cords. The cords are then passed, still in parallel relationship one to another, into a heated bed of fluidised solid material of the kind described in the specification of our co-pending patent application No. 11,355/57, to dry the cords. The cords are then fed to a conventional small calendar in which the cords are rubberised on both sides to form the rubberized fabric strip 17, 2½ inches wide. The strip 17 is passed through a conventional cooling or refrigerating device and a festoon device to the trimming device 4. As the strip 17 passes through the nip 101 between the rollers 84 and 86 of the trimming device 4, any surplus rubber at the edges of the strip is trimmed away by the cutting elements formed by the engagement of the flanges 95 and 96 on the roller 84 with the corresponding rings 97 and 98 on the roller 86. From the trimming device 4 the strip 17 is wound on the surface of the drum 3, passing between the drum surface and the pressure roller 6 which is spring-loaded towards the drum surface, the strip 17 then being wrapped around the drum 2 and returning to the drum 3 where the pressure roller 6 consolidates the butt joint formed between the lower edge of the strip 17 as it first meets the drum and the upper edge of hte strip after it has passed around both drums. The pressure roller 5 contacts the strip as it is wound around the drum 2 to ensure that the strip follows the desired path and to help to support the helically wound tubular length 18 formed from the strip 17.

The disposition of the drum axes is such that they both intersect the imaginary line X—X (see FIGURE 3) which lies near to the lower ends of the drums. This arrangement results in the peripheral distance around the drums in the lower regions thereof being less than the peripheral distance in the upper regions of the drums. Thus the tubular length 18 is formed in the upper regions of the drums with a perimeter which is such that the length will pass easily over the lower portions of the drums and fall away towards the bollard 7.

The tubular length 18 has an elongated transverse cross-sectional shape in the region adjacent the drums, and as it passes over the bollard 7 it is formed into a circular cross-sectional shape. The bollard diameter is slightly less than the internal diameter of the circular cross-section of the tubular length to enable the tubular length to move freely over the bollard, and the bollard may be coated with low-friction material to reduce the likelihood of the fabric sticking to the bollard. The lower edge 157 of the bollard 7 provides support for the tubular length in positions closely adjacent to the cutting edges of the knives 8 and 9, and enables the knives to sever the tubular length 18 into the bias-cut lengths 20 and 21.

The bias-cut lengths 20 and 21 pass, respectively, through the feed units 158, 159 to their associated spooling units 10 and 11. In setting up each feed unit and spooling unit it is necessary to ensure that the distance between the rollers 163 and the lower edge 157 of the bollard is sufficiently great to enable the severed length of bias-cut fabric to straighten from its curved tubular form into a flat sheet. The axes of the spools 22 and 23 contained, respectively, in the spooling units 10 and 11 require to be adjusted by rotating the subsidiary turntables 180 and by tilting the cradles 179, to a suitable angle for receiving the lengths 20 and 21. The feed unit rollers 163 to 166 also require to be adjusted by rotating the frames 160 about their pivots, to align the rollers 163 to 166 in directions parallel to the respective spool axes. The spool drive motors 177 are driven, during operation of the apparatus, to reel up the lengths 20 and 21 interleaved with lining material 171 on their respective spools, the motors being controlled, as described above, by the transducers connected to the tension control rollers 165 and 166.

When the spools 22 and 23 are filled with rubberised bias-cut fabric the apparatus is stopped, the frames 169 on which the spools are carried are removed from the cradles 179, and frames 169 carrying empty spools are substituted. During this operation the rubberised fabric strip 17 produced by the calender is stored in the festoon provided, to be withdrawn from the festoon when the operation of the apparatus is recommenced.

The bias angle of fabric produced by the apparatus may be altered by adjusting the variable-ratio gearbox 76 to alter the turntable speed, keeping the drum speed constant, and the width of the fabric lengths 20 and 21 may be altered by adjusting the spacing between the drum axes. Each of these adjustments, however, affects both bias angle and width of the fabric produced, and thus alteration of either bias angle or fabric width necessitates adjustments of both the drum spacing and the turntable speed.

Other adjustments which are made to the apparatus on changing either the bias angle or the width of the fabric lengths 20 and 21 are as follows:

(1) The bollard diameter is changed by substitution of a bollard of different diameter, and the knives are moved radially to positions corresponding to the new bollard diameter;
(2) The bollard surface speed is adjusted by the hand control 123;
(3) The angular positions, considered in a horizontal plane, of the knives relative to the spooling units are altered to correspond to the new angles at which the lengths 20 and 21 leave the bollard.

Additional adjustments which are only required when the bias angle is changed are:

(1) The planes of the knife blades with respect to the vertical direction are aligned with the desired cutting direction;
(2) The angular dispositions of the spooling units relative to the turntable axis are changed, to set the spool axes at right angles to the direction in which the fabric lengths are fed to the spools, and to ensure that the spool axes lie in the planes of the lengths 20 and 21, or in planes parallel thereto, respectively, by rotating the subsidiary turntables 180 and by tilting the cradles 179. The feed unit rollers 163 to 166 are aligned with the spool axes by rotating the frames 160 about their pivots.

Large alterations in the spacing between the drum axes may also necessitate a change in the disposition of the knife blades, since the cutting direction would require alteration to compensate for a change in the orientation of the cords of the helical length resulting from the change in diameter thereof.

The turntable 12 may alternatively be set to rotate at a slower speed than the speed of rotation of the tubular length, so that the knives are moved relatively to the tubular length in the opposite direction to that shown in FIGURE 1, and in this case the knife blades are tilted at an angle to the vertical opposed to that of the blades as shown in FIGURES 1 and 2a.

The height of the bollard relative to the feed units 158, 159 may need to be adjusted if large changes in bias angle or ply width are made, to ensure that the lengths 20 and 21 are able to straighten from the curved state into flat sheets by the time that they reach the feed units.

In the apparatus described, the rollers 163 are arranged vertically beneath the lower edge of the bollard 7, to ensure that the fabric lengths 20 and 21 are allowed to fall freely in a vertical plane to the rollers 163. If large changes in bollard diameters are made it may be necessary to move the rollers 163 in a radial direction with respect to the turntable axis to maintain the desired fabric path.

In the apparatus described above, the trimming device 4 contains plain rollers 84 and 86, but it may be desirable, in order to space the cords of the strips 17 accurately with respect to one another and to ensure that the cords are evenly distributed over the width of the strip, to provide at least one of the rollers with a plurality of annular grooves in its surface, the grooves being evenly distributed between the ends of the rollers. The number of grooves provided and the spacing between adjacent grooves is such that when the strip 17 of rubberised fabric is fed between the rollers the cords engage, and are correctly located by, the grooves.

It will be appreciated, from the above description, that weftless bias-cut fabric is continuously produced so that there is no need for a weaving operation and since the fabric is continuously produced and spooled at the correct width in one operation there is less handling of the material and, therefore, less likelihood of stretching and distortion of the fabric. The spools of bias-cut fabric are of a convenient small size for handling and, since the material is weftless, the cord spacing can be very close and consequently the strength of the fabric per unit width of a given cord size can be greater than the greatest strength obtainable from woven fabric of the same cords.

There are no joints in the bias-cut ply material and, therefore, a more uniform pneumatic tyre can be built from it.

As a result of the continuous production, without intermediate stages as in the prior method, storage problems are reduced.

On account of the fact that only narrow widths of material are handled the apparatus can be on a scale much smaller than that previously used and multiple units of apparatus of this kind which has just been described, can be used to provide a much more easily variable production of bias-cut ply material and one which is less affected by breakdown or maintenance troubles.

Although in the embodiment described above a strip of rubberised fabric is wound into helical form and severed to produce bias-cut rubberised fabric sheet, the apparatus and method described can also be used to produce unvulcanised rubber sheet from a narrow strip of unvulcanised rubber, no cord reinforcement being provided in this instance. This method of producing rubber sheet is useful in situations where no wide calender is available for its production. The strip of unvulcanised rubber may be produced, in a similar manner to the production of the strip 17, by a small calender. The calender may be mounted with the axes of its bowls parallel to the axis of one of the drums, and arranged to deliver rubber strip directly to the drum surface from the closely adjacent surface of a calender bowl, the edges of the strip being trimmed by a pair of spaced-apart knives contacting the bowl surface.

In an alternative embodiment of the invention, shown in FIGURE 7, apparatus 200 for producing measured lengths of unvulcanised rubber tube for use in the production of pneumatic tyre inner tubes comprises a calender 201; a pair of rotatable drums 202, 203; a bollard 204; a turret 205 and a take-off conveyor 206.

The calender 201 comprises three rotatable calender bowls 207, 208, 209. The bowls 208 and 209 are carried in bearings attached to a frame 210 and the bowl 207 is carried in a pair of bearing blocks 211 (only one of which is shown), one at each end of the bowl 207, which are vertically slidable in the frame 210 to enable the bowl 207 to be moved upwards or downwards to vary the size of the nip 212 formed between the bowls 207 and 208. A pair of cams 213, only one of which is shown, are mounted on a rotatable shaft (not shown) and are drivable by an electric motor (not shown) to move the bearing blocks 211 to vary the size of the nip 212. Unvulcanised rubber fed to the nip 214 formed between the bowls 208 and 209 emerges from the nip 212 as a strip 215, the thickness of which varies periodically according to the speed of rotation of the cams 213.

The rotatable drums 202, 203 are mounted and driven in a similar manner to the drums 2 and 3 of the apparatus of the previous embodiment, so as to form the strip 215 into a helically-wound tubular length 216. A trimming device 217, similar to the device 4 of the apparatus of the previous embodiment, is provided, and spring-loaded pressure rollers 218, 219 are provided, similar to the rollers 5 and 6 of the previous embodiment, to consolidate the helical joint 220 formed between successive turns of the strip 215 around the drums 202 and 203.

The bollard 204 is supported on a rotatable shaft 221 connected to drive means (not shown) which is adjustable in speed to match the surface speed of the bollard 204 to that of the drums 202, 203. A driving head 222 is formed on the bollard 204, the head 222 having teeth 223 for engagement with corresponding teeth 224 in a drive head 225 formed on one of three transfer bollards 226, 227, 228 carried by a rotatable hub 229 on the turret 205. The transfer bollards 226, 227 and 228 are each freely rotatably mounted on the hub 229 so as to be drivable by the bollard 204 and movable, one at a time, into a position axially aligned with the bollard 204. Means is provided for moving each transfer bollard axially to bring the teeth 223 and 224 into engagement when the transfer bollard is in the position of the transfer bollard 226 in FIGURE 7, and for disengaging the teeth to enable the hub 229 to rotate and bring the next transfer bollard into said position. The transfer bollards are each provided with nozzles 230 which are connected to means for supplying french chalk held in suspension in a current of air, the french chalk settling on the surface of the bollard and providing a lubricating action to help the tubular length 216 to slip downwardly over the bollard.

A rotary knife 231 is mounted on a support 232 which is movable radially with respect to the bollard 204 to bring the knife 231 into or out of cutting engagement with the tubular length 216 and which is also movable axially with respect to the bollard 204 from the position shown in FIGURE 7 to the position indicated by the dotted line 233, and back again. Driving means (not shown) is provided for moving the knife 231 radially inwardly, then downwardly in synchronism with the rate of descent of the tubular length 216 of rubber to sever a measured length 234. The knife driving means is arranged to return the knife 231 to a position level with that shown in FIGURE 7 and clear of the tubular length 216, after each cutting operation, ready for the next cutting operation.

In operation of the apparatus 200 described above the strip 215 of unvulcanised rubber is fed through the trimming device 217 and on to the drum 203. As in the previous embodiment, the drums 202 and 203 are driven, at a speed equal to the speed at which strip 215 is produced by the calender 201, to form the strip 215 into the helical length 216.

In producing lengths of unvulcanised rubber tube for moulding into inner tubes for pneumatic tyres, it is desirable that one side of the tube should be of greater thickness than the other side, and in order to achieve this the cams 213 are driven at a speed synchronized with the rate of rotation of the tubular length 216 (dependent on the drum rotational speed) so that the periodically thicker and thinner portions of the strips 215 emerging from the calender 201 lie respectively on the same sides of the tubular length 216 throughout each measured length of tube produced.

The bollard 204 forms the tubular length 216 into the cylindrical form required. The bollard 204 is driven at a speed of rotation equal to that of the tubular length 216 and drives the transfer bollard, with which it is connected by the engagement of the driving heads 222 and 225, at the same speed. The tubular length 216 slides from the bollard 204 to the transfer bollard, the french chalk provided through the nozzles 230 helping this sliding action, and when the measured length 234 has passed the knife 231, the drive means associated with the knife 231 is actuated, for example by an automatic mechanism associated with the drum drive and operative after a predetermined number of revolutions of the drums, to move the knife radially inwardly into cutting engagement with the tubular length. The knife is moved downwardly in synchronism with the rate of descent of the tubular length, and the rotation of the tubular length relative to the knife serves to sever the measured length 234 from the remainder of the tubular length 216. When the length 234 has been fully severed the knife 231 is retracted from the cutting position and returns to the position shown in FIGURE 7. The tubular length 234 drops on the transfer bollard clear of the driving head 222 and the turret 205 is rotated to bring another transfer bollard into position in driving engagement with the bollard 204, the transfer bollard carrying the tubular length 234 being moved to the position of the bollard 208 shown in FIGURE 7, and the tubular length is removed by the conveyor 206. It is necessary for the turret 205 to be rotated sufficiently quickly to cause engagement of the heads 222 and 225 before the tubular length 216 has descended below the level of the head 222. The operation of the apparatus then continues to produce further measured lengths 234 of unvulcanised rubber tube.

Although in the apparatus described, the calender 201 is shown with its calender bowls 207, 208 and 209 horizontally disposed, the calender may be positioned with the axes of the bowls vertically disposed. Moreover the calender 201 may be positioned very closely adjacent to the trimming device 217 and drum 203 so that there is no danger of the strip 215 sagging or being otherwise displaced from its desired path between the calender and the drums.

Having now described our invention, what we claim is:

1. A method of producing a tubular length of unvulcanised rubber or rubber covered fabric material comprising continuously helically winding a strip of said material upon a pair of spaced-apart drums rotatable on axes inclined one with respect to the other with the edges of successive turns of said strip joining to form a tubular length, and continuously consolidating the helical joint between adjacent helical turns.

2. A method of manufacturing a contiuous length of unvulcanised rubber or rubber covered fabric sheet material from a strip of said material having a narrower width than that of the length to be manufactured, comprising continuously producing a tubular length of said sheet material by the method according to claim 1 and continuously cutting the tubular length so formed to produce at least one continuous length of sheet material.

3. A method according to claim 2 for manufacturing a continuous length of bias-cut ply material from a strip of rubberized ply fabric having warp cords, comprising continuously cutting the tubular length in such a manner as to produce at least one continuous length of bias-cut ply material.

4. A method according to claim 3 of manufacturing continuous bias-cut ply material comprising feeding a plurality of closely adjacent parallel lengths of ply fabric filamentary material into at least one calender to apply a coating of unvulcanised rubber to both sides of the parallel lengths, cooling the strip of rubberised fabric thus formed, feeding the strip of rubberised fabric to an apparatus for trimming the edges of the strip to provide a strip having a required width, helically winding the fabric into a tubular length and cutting said length in such a manner as to produce at least one continuous length of bias-cut ply material.

5. A method according to claim 2 in which the tubular length is continuously cut at a plurality of positions.

6. A method according to claim 3 wherein two strips of rubberised fabric, partially superimposed on one another in a half-lapped relationship, are wound together on the drums to form a tubular length of double thickness.

7. A method according to claim 1 wherein measured lengths of tube are cut from the tubular length as it leaves the drums.

8. A method according to claim 1 of producing a tubular length of unvulcanised rubber for the manufacture of pneumatic tyre inner tubes comprising producing a continuous strip of unvulcanised rubber by means of a calender, feeding the srtip to an apparatus for trimming the edges of the strip to provide a strip of a required width, and helically winding the strip by the method claimed in claim 1, the calendering process being controlled to vary the thickness of the strip periodically so that when wound into a tubular length one side of the length is of greater thickness than the diametrically opposite side 9. Apparatus for producing a tubular length of unvulcanised rubber or rubber covered fabric material comprising a pair of spaced-apart drums having their axes inclined one with respect to the other, the drums being rotatable to wind a strip of said material helically to form said tubular length.

10. Apparatus for manufacturing a continuous length of unvulcanised rubber or rubber covered fabric sheet material comprising apparatus as claimed in claim 9 for producing a tubular length of said material, and means for continuously cutting the tubular length so formed to produce at least one continuous length of said sheet material.

11. Apparatus according to claim 9 wherein the drums are arranged with their axes at substantial angles to the horizontal so as to wind the strip in a substantially horizontal direction and to feed the tubular length downwardly from the drums.

12. Apparatus according to claim 10 wherein the means for continuously cutting the tubular length comprises at least one knife mounted on a rotatable support and means for rotating the support at a predetermined speed relative to the speed of rotation of the drums, to move each knife in engagement with the tubular length.

13. Apparatus according to claim 12 wherein each knife, consists of a metal disc rotatably mounted on the rotatable support, means being provided for driving the disc at a high speed.

14. Apparatus according to claim 10 wherein two cutting means are provided located in angularly displaced positions relative to one another to cut the tubular length into two continuous lengths of sheet material.

15. Apparatus according to claim 12 wherein each knife is mounted on the rotatable support so as to be adjustable both in the axial and in the radial directions with respect to the axis of rotation of the support, the angular positions of each knife in a plane perpendicular to the axis of the support also being adjustable.

16. Apparatus according to claim 12 comprising a locating bollard for receiving the tubular length of material from the drums and supporting the length in the region adjacent to the cutting knife or knives, and means for driving the bollard at a predetermined surface speed proportional to the surface speed of the drums.

17. Apparatus according to claim 16 wherein the bollard is mounted below the drums on a rotatable shaft disposed with its axis extending vertically substantially mid-way between the drums.

18. Apparatus according to claim 17 wherein the bollard is axially adjustably secured to said rotatable shaft.

19. Apparatus according to claim 12 comprising a spooling means for each continuous length of sheet material cut from the tubular length, a rotatable support for said spooling means mounted coaxially with respect to the rotatable support for said cutting means, means for driving the support in synchronism with the support for the cutting means.

20. Apparatus according to claim 19 wherein the rotatable support for the spooling means comprises a turntable disposed substantially vertically beneath the drums and rotatable about a substantially vertical axis, means being provided for driving the turntable at a predetermined speed relative to the speed of rotation of the drums.

21. Apparatus according to claim 20 wherein the support for the cutting means is attached to, and rotatable with, the turntable.

22. Apparatus according to claim 19 wherein the spooling means comprises a rotatably mounted take-up spool and a liner supply spool, and means for driving the take-up spool.

23. Apparatus according to claim 22 wherein means is provided for feeding the continuous length of sheet material to the take-up spool, comprising control means for actuating the means for driving the take-up spool to increase the speed of rotation of said spool when the tension in the material fed to the spool is reduced below a desired value and to decrease the speed of rotation of said spool when the tension in the material fed to the spool increases above a desired value.

24. Apparatus according to claim 22 wherein said turntable is provided with a subsidiary turntable mounted thereon and rotatable about an axis of rotation parallel to the turntable axis, the take-up spool being mounted on a cradle attached by a pivot to the subsidiary turntable, and the axis of the pivot being in a plane at right angles to the axis of the subsidiary turntable, whereby the angular disposition of the take-up spool axis in a plane at right angles to the turntable axis may be adjusted by rotation of the subsidiary turntable and the angular disposition of the take-up spool axis in a plane parallel to the turntable axis may be adjusted by rotation of the cradle about its pivot.

25. Apparatus according to claim 20 comprising a first electric motor for driving the drums, and a second electric motor for driving the turntable, a device connected to said first electric motor for controlling the speed of the second electric motor so as to drive the turntable at a desired speed relative to the speed of rotation of the drums.

26. Apparatus according to claim 25 in which the device for controlling the speed of the second electric motor comprises a magslip drivable by the first motor, a magslip drivable by the second motor, one of the magslips being driven by the associated motor through a gear box to equalise the speeds of rotation of the two magslips when the drums and the turntable are rotating at predetermined relative speeds and one of the magslips being driven by its associated motor through a variable gearbox, and means actuated by the two magslips for controlling the speed of the second motor to equalise the speeds of the two magslips.

27. Apparatus according to claim 9 comprising drum supports in which said two drums are rotatably mounted and which are movable relative to one another to alter the distance between the drum axes.

28. Apparatus according to claim 27 in which the drum supports are slidable within separate housings, each housing being mounted on a supporting frame, the two housings being independently angularly movable about a common pivotal axis to adjust the inclination of one drum axis with respect to the other drum axis.

29. Apparatus according to claim 28 in which each housing is provided with screw means to slide the drum support, and in which a pair of screw means are provided in the supporting frame, one for each housing, for angularly moving the housings about their pivotal axis.

30. Apparatus according to claim 9 wherein each drum is provided with an internal fluid circulation passage.

31. Apparatus according to claim 9 wherein a freely rotatable pressure roller is provided adjacent to one of the drums and disposed with its axis substantially parallel to that of the associated drum, means being provided for urging said roller towards the drum to bear upon the helical joint formed between adjacent helical turns of the strip to consolidate the joint.

32. Apparatus according to claim 31 wherein each drum is provided with a freely rotatable pressure roller.

33. Apparatus according to claim 9 wherein trimming apparatus is provided to remove surplus material from the edges of said strip before winding said strip around the drums.

34. Apparatus according to claim 33 wherein said trimming apparatus comprises a pair of freely rotatable rollers mounted in a support with their axes parallel to one another and movable towards or away from one another, means being provided for urging the rollers towards one another, the ends of the rollers being provided with cutting elements for trimming said strip to a desired width.

35. Apparatus according to claim 34 wherein the cutting elements each comprise a flange formed on one roller overlapping and bearing against an edge of a corresponding recess formed on the other roller.

36. Apparatus according to claim 34 wherein at least one of the rollers is provided with a plurality of annular grooves on its surface, the grooves being evenly distributed between the ends of the rollers, the number of grooves and the spacing between adjacent grooves being such that when a strip of rubberised fabric containing warp cords is fed between the rollers the cords engage, and are equally spaced-apart by, the grooves.

37. Apparatus according to claim 9 wherein means is provided for severing measured lengths of tube from the tubular length as it leaves the drums.

38. Apparatus according to claim 37 wherein said means comprises a knife mounted so as to be movable transversely with respect to said tubular length into engagement therewith, driving means being provided for moving the knife in the direction of movement of the tubular length as said length leaves the drums to sever a measured length of tube from said tubular length.

39. Apparatus according to claim 38 wherein a rotatable bollard is provided for receiving and supporting the measured length of tube during the process of formation and severing of said length of tube, means being provided for rotating the bollard at a surface speed proportional to the surface speed of rotation of the drums.

40. Apparatus according to claim 39 wherein said bollard is carried on a rotatable shaft, the shaft being drivably supported at one end adjacent to the drums and the bollard being positioned at the other end of the shaft in a position to receive said tubular length.

41. Apparatus according to claim 40 wherein a rotatable transfer bollard is provided, means being provided to move the transfer bollard into a position coaxial with said bollard to receive the tubular length during the formation thereof, said transfer bollard being drivably engageable with the bollard and movable by the said means after severance of the measured length of tube from the tubular length to remove said measured length from the region of the bollard.

42. Apparatus according to claim 41 wherein said means for moving the transfer bollard comprises a turret, said turret carrying a plurality of transfer bollards, said means operating to bring the transfer bollards one at a time into a position to receive the tubular length.

43. Apparatus according to claim 37 wherein a calender is located adjacent to the drums for producing a strip of unvulcanised rubber to be fed to the drums, means being provided for adjusting the nip of the calender periodically to produce a strip in which the thickness varies periodically and means being provided for controlling the calender nip adjusting means according to the rate of rotation of the drums so that when the strip is wound into a tubular length one side thereof is of greater thickness than the diametrically opposite side thereof.

References Cited in the file of this patent

UNITED STATES PATENTS

| | | |
|---|---|---|
| 1,723,968 | Denmire | Aug. 6, 1929 |
| 1,747,652 | Seiberling | Feb. 18, 1930 |
| 1,944,970 | Dieffenbach | Jan. 30, 1934 |
| 1,971,697 | Schieren | Aug. 28, 1934 |
| 1,996,491 | Schnedarek et al. | Apr. 2, 1935 |